Figure 1:
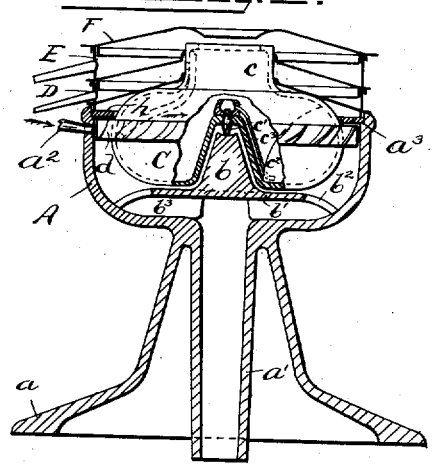

2 Sheets—Sheet 1.

P. M. & D. T. SHARPLES.

CENTRIFUGAL SEPARATOR.

No. 11,311. Reissued Feb. 28, 1893.

Witnesses

Ed. A. Kelly

David Levan

Philip M. Sharples

David T. Sharples Inventors

By their Attorney W. Littlewood

2 Sheets—Sheet 2.

P. M. & D. T. SHARPLES.

CENTRIFUGAL SEPARATOR.

No. 11,311.

Reissued Feb. 28, 1893.

Philip M. Sharples
David T. Sharples
Inventors

Witnesses
Ed. A. Kelly
David Lewan

By their Attorney J. H. Stewart

UNITED STATES PATENT OFFICE.

PHILIP M. SHARPLES, OF WEST CHESTER, PENNSYLVANIA, AND DAVID T. SHARPLES, OF ELGIN, ILLINOIS.

CENTRIFUGAL SEPARATOR.

SPECIFICATION forming part of Reissued Letters Patent No. 11,311, dated February 28, 1893.

Original No. 442,461, dated December 9, 1890. Application for reissue filed July 30, 1892. Serial No. 441,891. Patented in England June 25, 1890, No. 9,852; in Germany August 24, 1890, No. 62,866; in France August 30, 1890, No. 207,951; in Belgium January 9, 1891, No. 93,384; in New South Wales February 12, 1891, No. 2,799; in Victoria May 28, 1891, No. 8,759; in Canada October 21, 1891, No. 37,647, and in Sweden February 21, 1892, No. 3,421.

*To all whom it may concern.*

Be it known that we, PHILIP M. SHARPLES, of West Chester, Chester county, Pennsylvania, and DAVID T. SHARPLES, residing at Elgin, in the county of Kane and State of Illinois, have invented certain new and useful Improvements in Centrifugal Separators, (for which we have obtained Letters Patent in the following countries: Great Britain, No. 9,852, dated June 25, 1890; France, No. 207,951, dated August 30, 1890; Germany, No. 62,866, dated August 24, 1890; Belgium, No. 93,384, dated January 9, 1891; Canada, No. 37,647, dated October 21, 1891; Sweden, No. 3,421, dated February 21, 1892; New South Wales, No. 2,799, dated February 12, 1891, and Victoria, No. 8,759, dated May 28, 1891;) and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates more especially to that class of centrifugal machines which are adapted to separate the lighter from the heavier constituent of a compound fluid, as cream from the blue milk.

The improvements relate mainly to the method of operating the centrifugal vessel and of increasing its capacity. The centrifugal vessel is suspended in a casing and is operated directly by the motive power, a driving spindle being dispensed with and the balancing of the vessel only being required. The motive power is applied at the outer wall of the vessel and is preferably a heated jet or jets (as of steam) which, while driving the vessel at the same time by contact with said outer wall imparts to the heavier constituent of the compound liquid (as milk) undergoing separation an increased heat which materially assists in hastening the complete separation of the lighter constituent (cream) without materially heating the latter.

Other features are set forth in connection with the accompanying drawings, in the following detailed description of the practical application of the invention.

Figure 2:
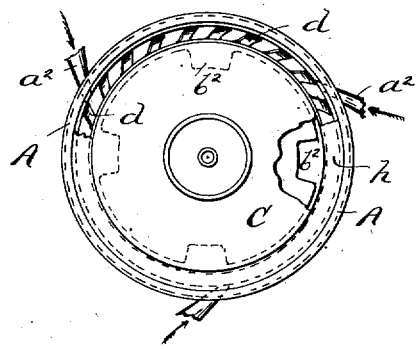
Figure 3:
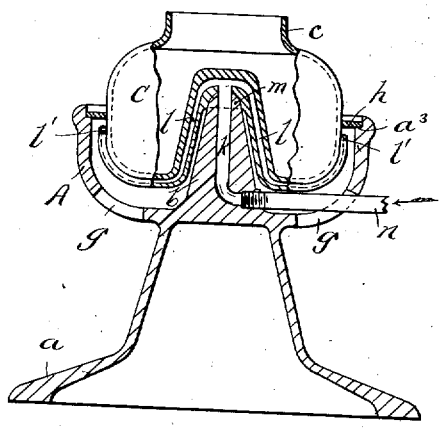
Figure 4:
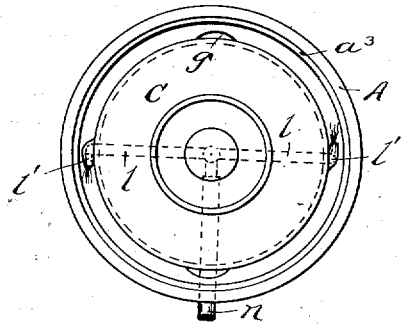

Figure 1 is a partly sectional elevation of a machine of preferred construction embodying our invention. Fig. 2 is a plan view of the same with the skim milk and cream receptacles removed and showing the arrangement of three jets. Figs. 3 and 4 are respectively a sectional elevation and a plan of a machine showing some modifications of our invention.

The centrifugal separator-vessel C which is represented as mainly of a well known form in vertical machines, is dished at the bottom and provided with a central pivot $c'$ which is socketed in a step $b$, forming part of the casing or frame A. This step is projected upward in the dished base of the vessel so as to bring the suspension point $c'$ to about the center of gravity of the vessel and its load when the machine is in operation. The casing A rests upon a suitable base $a$ and is formed with a central passage $a'$ communicating at its lower end with any suitable conduit. The step $b$ extends upward from a partition plate $b'$ which is located between the base of the separator vessel and the mouth of the passage $a'$, forming a chamber $b^3$ communicating by openings $b^2$ with the upper portion of the casing. Upon the upper edge of the casing is supported in an ordinary manner receptacles D and E and cover F which extend inward to the open throat $c$ and receive respectively the skim milk and cream which are continuously delivered during the operation of the machine. The new milk is admitted in any suitable manner as through a tube $c^3$ in front of a blade $c^2$ which compels it to rotate with the vessel.

The motive power which we employ to rotate the vessel C consists preferably of one or more jets, as of steam, directed by suitably located nozzles $a^2$ against wings or buckets $d$ projecting from the periphery of the vessel. These projections which are represented as forming part of a band secured to the periphery of the vessel, are preferably arranged in the same horizontal plane with the point of suspension $c'$, and a single jet may be thus employed without necessarily affecting the balancing of the vessel. The projections $d$ may be arranged and shaped in any desired manner but are here shown as forming an acute angle with the periphery of the vessel on the side against which the jet impinges, and also out of line axially, the lower edge being behind the upper. The nozzles $a^2$ of which three are represented in Fig. 2 are shown as directed downward in Fig. 1 and are arranged symmetrically so that their combined action when properly adjusted does not affect the balancing of the vessel. Immediately above the projections $d$ an annular partition $h$ of glass or other non-heat-conducting material is supported on a circular ledge $a^3$ of the casing A, its inner edge being arranged to clear the periphery of the rotating vessel.

Our machine may be operated directly by the action of any escaping jet; but we prefer to use generally either steam or some heavier fluid projected thereby, first because the great speed at which vessels of this character are rotated necessitates the use of a jet of high velocity, and secondly because of the effect which the heat thus applied has in accelerating and completing the separation of the cream from the milk, which effect we will now describe. As the new milk is admitted to the vessel in a continuous stream it is gradually brought under the centrifugal action and almost immediately there is an incomplete separation of the cream from the blue milk, the latter with a proportion of the cream still mixed with it being thrown toward the outer wall of the vessel. On account of the greater facility with which these particles of cream can tear loose from their mechanical mixture with the blue milk it has been customary and advantageous to feed the new milk into the vessel at a higher temperature than would otherwise be done. In our machine however though the new milk be at a lower temperature the separation will be more rapid and thorough than with warmer milk ordinarily, which is due to the fact that after the main portion of the cream has been separated by the first effect of the centrifugal force, the milk which still contains a considerable proportion of cream, is thrown against the outer wall of the vessel and heated thereby owing to the contact of the hot jet or jets with the outer surface. The temperature being thus raised, every particle of cream is quickly released from the skim milk and finds its way to the inner wall of cream, the temperature of which may be slightly raised thereby though it will still be considerably cooler than usual, and yet a larger proportion of it will be obtained in less time.

The purpose of the annular partition $h$ is to prevent any noticeable effect of heat upon the parts above the same by reducing the space through which the chambers above and below the partition are in communication. The downward direction of the jet tends to deflect it below the projecting buckets $d$, and the fan like action of the latter assists in exhausting the steam exclusively through the openings $b^2$ and central passage or exhaust outlet $a'$, the deflector plate $b'$ which extends nearly to the periphery of the vessel tending to prevent contact of the steam with the bottom of the vessel.

In Figs. 3 and 4 we have illustrated a modified construction embodying however the main features of our invention. The separator vessel is suspended in substantially the same way except that the point of suspension $m$ is shown considerably above the center of gravity. It is rotated by reaction instead of impact, steam being admitted through a pipe $n$ and central steam passage $k$ through the step $b$, said passage communicating by a ball joint at $m$ with branches $l$ $l$ terminating in nozzles $l''$ at the periphery of the vessel. These nozzles are shown decidedly below both the center of gravity and point of suspension of the vessel, which arrangement, though inferior to that already described is yet quite satisfactory especially if the jets be symmetrically arranged so as to balance each other. The exhaust in this case is through openings $g$ in the wall of the casing.

The advantages of our improved construction and method of operation over those heretofore in use are very decided. The method of suspending and operating the separator vessel directly as described has the very great advantage of necessitating but one balancing, whereas when a driving spindle is used, whether operated by a steam jet or otherwise, not only must both the spindle with its attachments and the vessel be placed and kept in balance but bearings must be used which are a great source of trouble. The extremely high speed at which these vessels revolve makes the perfect balancing of them a necessity and the accomplishment of this is greatly simplified by employing but one revolving body and but one step as in our construction. When a driving spindle is used the center of balance of the vessel and spindle combined (which is the center of rotation) must be exactly in the center of the spindle, or else the bearings will necessarily become heated. The minutest variation of the center of the spindle from this true center of rotation will thus cause trouble in the bearings whereas in our construction the variation of the center of suspension from the true center of rotation may be comparatively large without noticeable effect. When the point of suspension is at the center of gravity of the loaded vessel and the jets of steam, compressed air, or other suitable medium act upon the periphery on the same horizontal plane as the center of suspension, the highest degree of efficiency will be secured though slight variations do not materially affect the results.

The important advantage gained by heating the partially skimmed milk during the operation of the machine, thus securing cooler cream and yet a perfect and rapid separation of it from the blue milk has been already referred to.

The use of compressed air as suggested instead of steam would by its expansion tend to cool the rotating liquid and so effect the rapidity of separation but we prefer to use steam for the reasons stated. If the whole mass of milk in the bowl be equally changed in temperature the separation will still be accelerated; but it is advantageous to discharge the cream as cool as practicable, though it is necessarily affected to some extent.

Having thus fully set forth our invention and the means for practically and advantageously using it, we do not limit it to the forms of machine illustrated; but

What we claim is—

1. The improvement in the process of creaming milk by centrifugal force which consists in simultaneously changing the temperature of the rotating compound liquid to facilitate the separation of the constituent parts, substantially as set forth.

2. The improvement in the process of creaming milk by centrifugal force which consists simultaneously in increasing the temperature of the portion of the liquid in the rotating separator vessel which is farthest from the center of rotation, substantially as and for the purpose set forth.

3. The improvement in the process of creaming milk by centrifugal force which consists in heating the wall of the separator vessel during its operation whereby the heavier outer portion of the liquid is made warmer than the lighter inner portion, substantially as and for the purpose set forth.

4. In a centrifugal machine a separator vessel suspended upon a fixed bearing located substantially in the perpendicular passing through the center of gravity of the loaded vessel, in combination with means for applying rotating power directly to said vessel, substantially as set forth.

5. In a centrifugal machine a rotary separator vessel pivotally suspended substantially as described, in combination with a nozzle or nozzles located at the periphery of the vessel and adapted to apply a jet as of steam thereto, whereby said vessel is directly rotated and the jet utilized to affect the temperature of the rotating liquid, substantially as and for the purpose set forth.

6. In a centrifugal machine a separator vessel suspended at the center of gravity of the loaded vessel upon a fixed bearing, in combination with means for applying rotating power at the periphery of said vessel, substantially as set forth.

7. In a centrifugal machine the combination with the casing provided with an exhaust outlet or outlets and with the receptacles supported thereon, of a separator vessel suspended within said casing and provided with a series of peripheral projections located above said exhaust outlet and arranged at an angle to the axial plane, substantially as described, and a nozzle arranged to direct a jet (as of steam) against said projections, substantially as set forth.

8. In a centrifugal machine a separator vessel suspended upon a fixed bearing in combination with means for applying rotating power to the periphery of said vessel upon the same horizontal plane as the center of suspension, substantially as set forth.

9. In a centrifugal separator the combination with a suspended rotary vessel operated directly by steam, substantially as described of a casing provided with a central exhaust outlet as $a'$, an intermediate perforate plate forming an exhaust chamber $b^3$, and a central support, as $b$, substantially as set forth.

10. In a centrifugal machine the combination with a suspended separator vessel and a steam nozzle located at the periphery thereof substantially as described of a casing provided with an exhaust outlet below said vessel, liquid receptacles supported on said casing above said nozzle and a partition as $h$ between said nozzle and receptacles, substantially as set forth.

In testimony whereof we affix our signatures in the presence of two witnesses.

PHILIP M. SHARPLES.
DAVID T. SHARPLES.

Witnesses as to P. M. Sharples:
A. R. LODGE,
E. B. MANCILL.

Witnesses as to D. T. Sharples:
L. H. ELLIOTT,
A. V. WOOD.